L. BALOGH & G. SZÉLES.
SOLDERING IMPLEMENT.
APPLICATION FILED MAY 11, 1914.
1,106,357.
Patented Aug. 11, 1914.
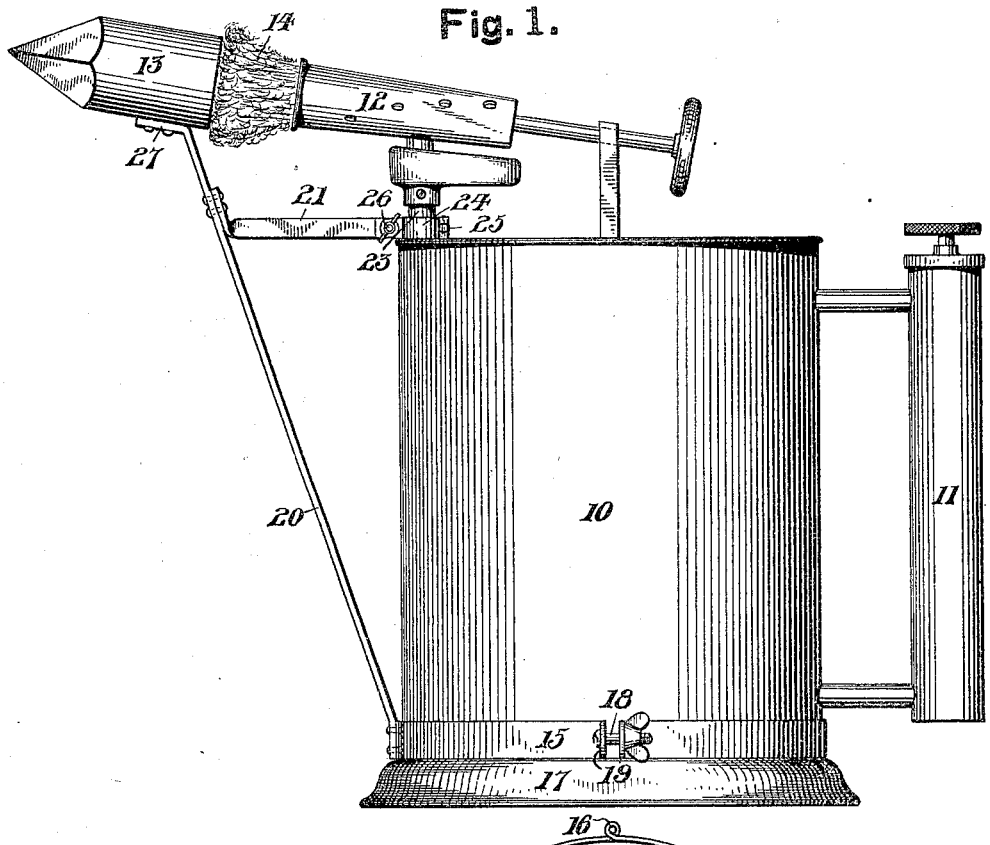
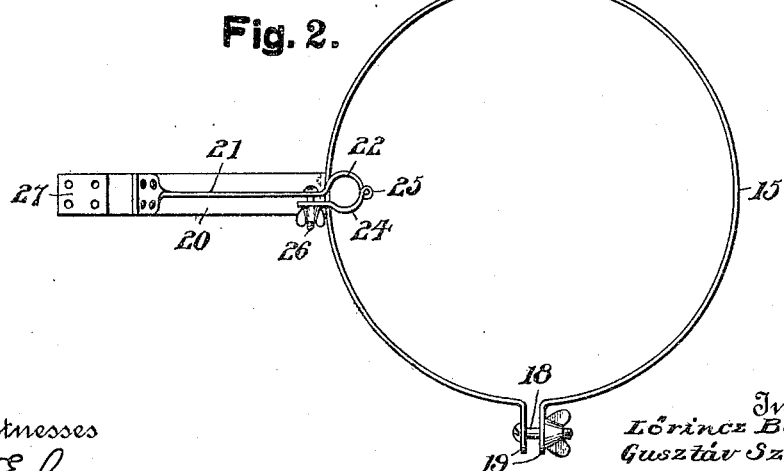

UNITED STATES PATENT OFFICE.

LÖRINCZ BALOGH AND GUSZTÁV SZÉLES, OF DETROIT, MICHIGAN.

SOLDERING IMPLEMENT.

1,106,357. Specification of Letters Patent. Patented Aug. 11, 1914.

Application filed May 11, 1914. Serial No. 837,794.

*To all whom it may concern:*

Be it known that we, LÖRINCZ BALOGH and GUSZTÁV SZÉLES, subjects of the King of Hungary, residing at Detroit, in the county of Wayne and State of Michigan, have invented certain new and useful Improvements in Soldering Implements, of which the following is a specification.

This invention relates to certain new and useful improvements in soldering implements.

The primary object of this invention is to provide an attachment for a gasolene torch whereby a soldering iron or point is carried by the torch in a position to be heated thereby simultaneously with its employment in the soldering operation.

A further object is to provide a gasolene torch with a soldering point removably mounted thereon and positioned in the normal direction of the torch flame, the soldering point being operatively positionable by manually moving the torch.

A still further object is to provide a gasolene torch heated soldering iron adaptable for continuous heating simultaneously with the soldering operation.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and wherein like numerals of reference designate corresponding parts throughout the several views:—Figure 1 is a side elevation of a gasolene torch provided with the present invention, and, Fig. 2 is a top plan view of the attaching bracket removed from the torch and with the soldering point detached from the bracket.

Referring more in detail to the drawings, it will be noted that it is designed to provide the usual construction of gasolene torch 10 which has the usual handle 11 and burner 12 with a bracket for supporting a soldering point 13 in the direct line of the flame 14 of the torch. Such bracket consists of a split ring 15 having its two parts connected by a hinge 16 and adapted to encircle the lower portion of the torch 10 for seating upon the base 17 thereof, the ring 15 being removably secured thereto by means of a bolt 18 connecting the outwardly turned ends 19 of said ring.

An inclined strap 20 is secured to the forward portion of the ring 15 and is provided with a brace 21 adjacent the top thereof and having its end curved as at 22 for fitting the burner pipe 23 of the torch. A clamp 24 hinged at the point 25 to the brace end 22 fits around the said pipe 23 while the end of the clamp 24 is connected to the brace 21 by means of the bolt 26.

The strip 20 is provided with an outwardly inclined top end 27 upon the top of which the soldering point 13 is rigidly secured and being thereby positioned in substantial axial alinement with the burner 12 and within the direct path of the burner flame 14.

From this detailed description of the invention it will be apparent that the soldering point 13 may be readily attached and detached from the torch by means of the bracket and that while positioned upon the torch as illustrated in Fig. 1, the soldering point may be operatively applied by conveying the torch and point by means of the torch handle 11 while at all desired times, the torch will be heating the soldering point by the contacting flame 14 and simultaneously with the soldering operation if so desired.

While the form of the invention herein shown and described is what is believed to be a preferable embodiment thereof, it is nevertheless to be understood that various forms and modifications may be resorted to which fall within the spirit and scope of the invention as claimed.

What we claim as new is:—

1. In combination with a gasolene torch, an encircling ring therefor, an inclined strip carried by said ring, a torch pipe having a burner leading from said torch, a brace upon said strip removably attached to the torch pipe, and a soldering point secured to the upper end of said strip in alinement with the torch burner.

2. A device of the class described, comprising a split ring having the portions thereof hinged together and adapted to encircle a gasolene torch, an inclined strip mounted upon said ring and having an outwardly bent top portion, an outwardly projecting soldering point rigidly secured to the top of said outwardly bent strip portion, an inwardly-extending brace secured to said strip adjacent the top thereof, and a hinged clamp member mounted upon the free end of said brace.

In testimony whereof we affix our signatures in presence of two witnesses.

LÖRINCZ BALOGH.
GUSZTÁV SZÉLES.

Witnesses:
BERNARD DUSCHINSKY,
PAUL FELLETS.

Copies of this patent may be obtained for five cents each, by addressing the "Commissioner of Patents, Washington, D. C."